United States Patent [19]

Kaleh

[11] Patent Number: 5,048,058
[45] Date of Patent: Sep. 10, 1991

[54] MSK MODULATION AND DIFFERENTIALLY COHERENT DETECTION TRANSMISSION SYSTEM

[76] Inventor: Ghassan K. Kaleh, 46, rue Barrault, 75634 Paris Cedex 13, France

[21] Appl. No.: 318,051

[22] Filed: Feb. 17, 1989

[30] Foreign Application Priority Data

Feb. 19, 1988 [FR] France .................................. 88 02016

[51] Int. Cl.[5] ............................................ H04L 27/10
[52] U.S. Cl. ...................................... 375/47; 375/90; 329/300
[58] Field of Search ......................... 375/18, 27, 47, 56, 375/84, 90, 101; 329/318, 300, 327, 336; 341/143

[56] References Cited

U.S. PATENT DOCUMENTS

| | | | |
|---|---|---|---|
| 3,809,817 | 5/1974 | Gill et al. | 375/56 |
| 4,324,001 | 4/1982 | Rhodes | 375/90 |
| 4,346,472 | 8/1982 | Ohkoshi | 375/56 |
| 4,609,907 | 9/1986 | Adler et al. | 375/18 |
| 4,656,648 | 4/1987 | Vallet | 375/90 |
| 4,661,945 | 4/1987 | Hirosaki | 375/27 |
| 4,706,261 | 11/1987 | Torre et al. | 375/8 X |

OTHER PUBLICATIONS

Nakajima et al., "Gaussian Filtered & Amplitude Limid MSK IECE of Japan", vol. E64, No. 11, Nov. 1981.
Galko et al., "Linear Receivers for Correlatively Codes MSK", IEEE Transaction on Communication, vol. Com 33, No. 4, 4/1985.
Prabhu "MSK Offset OPSK Modulation with Band Limiting Filters" IEEE Transaction Aerospace Electronic System, vol. AES-17, No. 1, 1/1981.
M. K. Simon and C. C. Wang, "Differential Detection of Gaussian MSK in a Mobile Radio Environment", IEEE Transactions on Vehicular Technology, vol. VT-33, No. 4, Nov., 1987.

*Primary Examiner*—Douglas W. Olms
*Assistant Examiner*—Stephen Chin
*Attorney, Agent, or Firm*—Lowe, Price, LeBlanc, Becker & Shur

[57] ABSTRACT

An embodiment of the transmission system comprises an MSK linear-modular transmitter and an MSK differentially coherent receiver connected by a transmission medium 3. A system embodying the invention is essentially characterized by filters in the receiver including analog or digital equalizers and by a differential encoding carried out on symbols of a message to be transmitted by a differential encoder included in the transmitter. The function of the equalizer is to eliminate intersymbol interference in received signals. The differential encoding carried out is such that a coded symbol of rank k issued by the encoder depends on the corresponding symbol of the message and on the coded symbol of rank k-M, whereby M is an odd integer preferably greater than 1. On reception the probability of decision error with regard to a received symbol is all the lower that the integer M is high. The value M=3 is an appropriate value.

32 Claims, 5 Drawing Sheets

MSK MODULATION AND DIFFERENTIALLY COHERENT DETECTION TRANSMISSION SYSTEM

BACKGROUND OF THE INVENTION

1. Field of the Invention

This invention relates to continuous phase modulation in general. More particularly, the invention relates to a binary modulation and differentially coherent detection transmission system.

The differentially coherent detection of a continuous phase signal is a particularly interesting solution in situations where carrier recovery is difficult, due to the simplicity of the receiver which is derived from it and to its performances. The performances obtained for this type of detection present a slight fall off by comparison with the performances obtained with a coherent detection requiring a receiver of greater complexity.

Furthermore, continuous phase modulation with a modulation index equal to 0.5, known to those skilled in the art as MSK (Minimum Shift Keying) modulation, has the advantage of spectral compactness of the modulated signal notably by comparison with four-state phase modulation (PSK).

These two reasons, inter alia, result in MSK modulation with differentially coherent detection being considered for use notably for digital data connections between mobile radio terminal equipment in the project for a telecommunications by satellite system (MSAT) for mobile terminal equipment.

In this context, it is desirable to supply transmitter/receiver equipment providing increased performances by comparison with the existing transmitter/receiver equipment.

2. Description of the Prior Art

M. K. SIMON and C. C. WANG describe in the article "Differential Detection of Gaussian MSK in a Mobile Radio Environment", IEEE Transactions on Vehicular Technology, Vol. VT-33, No. 4, Nov. 1987, a transmission system with GMSK (Gaussian MSK) modulation and differentially coherent detection using in a receiver a Gaussian type impulse response receiver filter, in which a message comprised of a string of symbols to be transmitted from the transmitter towards a receiver is differentially coded in the transmitter into a string of coded symbols in such a way that a coded symbol of rank k in the string depends on the corresponding symbol of same rank in the message and on the coded symbol of rank k−2. A delay of duration 2 T, where T is the rate period at which the symbols are issued, is provided in the receiver so as to delay a received coded signal carrying the string of coded symbols. The received signal and the delayed received signal are multiplied so as to deduct by low-pass filtering from the product obtained a signal of which samples at instants kT are compared to a non-zero amplitude threshold so as to decide the values to be attributed to each of the message symbols.

This GMSK modulation transmission system reduces the probability of decision error with regard to the received symbols in comparison with other known equipment. A better aperture of the eye chart is obtained subsequent to the differential coding carried out according to which a $k^{th}$ coded symbol depends on the $(k-2)^{th}$ coded symbol and not on the $(k-1)^{th}$ as is usually the case. However, in this system, the intersymbol interference that is inherent to MSK modulation is not eliminated from the received signal. A greater reduction of the probability of decision error can be obtained by a transmission system in which the noise intersymbol interference would be eliminated from the samples of the received signal.

OBJECT OF THE INVENTION

The object of this invention is to provide such a transmission system in which the intersymbol interference is eliminated from the samples of the received signal.

SUMMARY OF THE INVENTION

Accordingly, an MSK type continuous phase modulation transmission system comprises differentially coherent transmitting equipment and receiving equipment which are connected through a transmission medium. The transmitting equipment comprises means for coding an incoming message comprised of an ordered string of K symbols successively issued at a predetermined period, T, where K is any integer greater than one, into an ordered coded string of K differentially coded symbols and delivers an MSK type continuous phase signal modulated by a string of impulses carrying said ordered coded string. The receiving equipment comprises additional means in cascade with a matched filter for filtering in samples of a string of received impulses an intersymbol interference inherent to said MSK type continuous phase signal.

Said additional filtering means are comprised of an equalizer.

The receiver includes delay circuitry for multiplying a pair of received components such that one of the components is delayed relative to the other components by MT.

The integer M is an odd integer thereby simplifying the structure of a decision circuit included in the receiving equipment. The theoretical calculations show that the probability of decision error is all the lower that the integer M is high. Nevertheless, almost all the possible reduction of the probability of decision error through increase of the integer M is obtained at M=3.

In the transmission system embodying the invention, for a same probability of decision error, the signal/noise ratio required for the received modulated signal in the receiving equipment is reduced by approximately 1.5 dB by comparison with that required in the transmission system described by M. K. SIMON and C. C. WANG.

BRIEF DESCRIPTION OF THE DRAWING

The foregoing and other objects, features and advantages of the invention will be apparent from the following detailed description of several embodiments of the invention with reference to the corresponding accompanying drawings in which.

DESCRIPTION OF THE PREFERRED EMBODIMENTS

Figure 1:
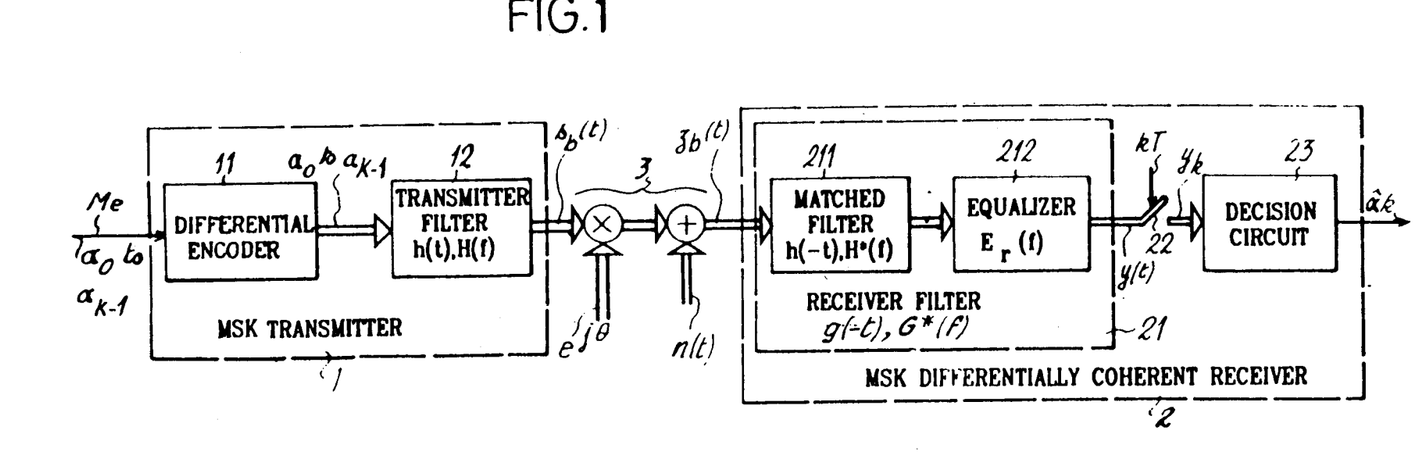
FIG. 1 is a simplified schematic diagram of the general structure of the transmission system embodying the invention.
Figure 3:
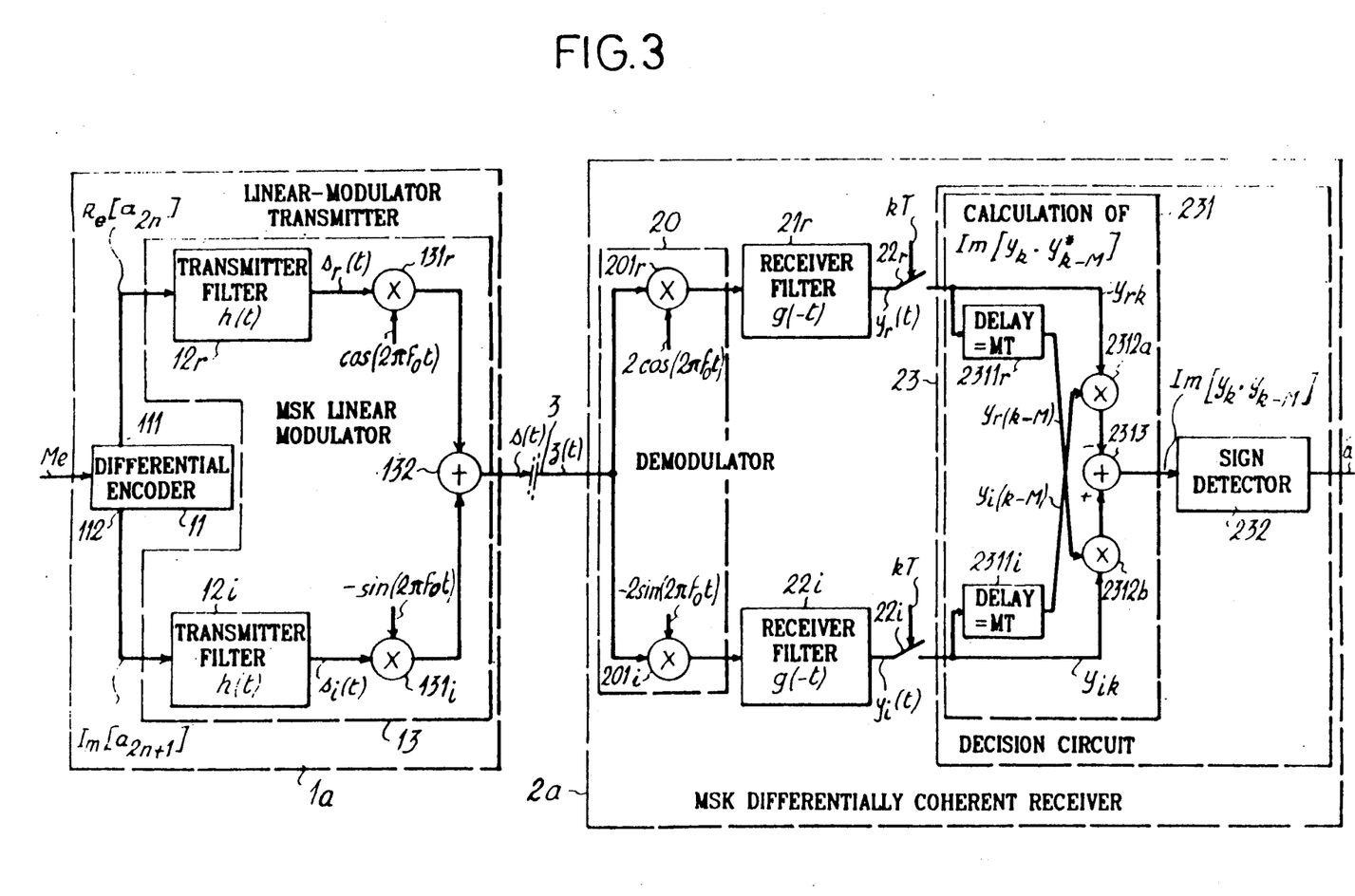
FIG. 3 is a block diagram of a first preferred embodiment of the transmission system comprising a receiver with baseband receiver filters.
Figure 4:
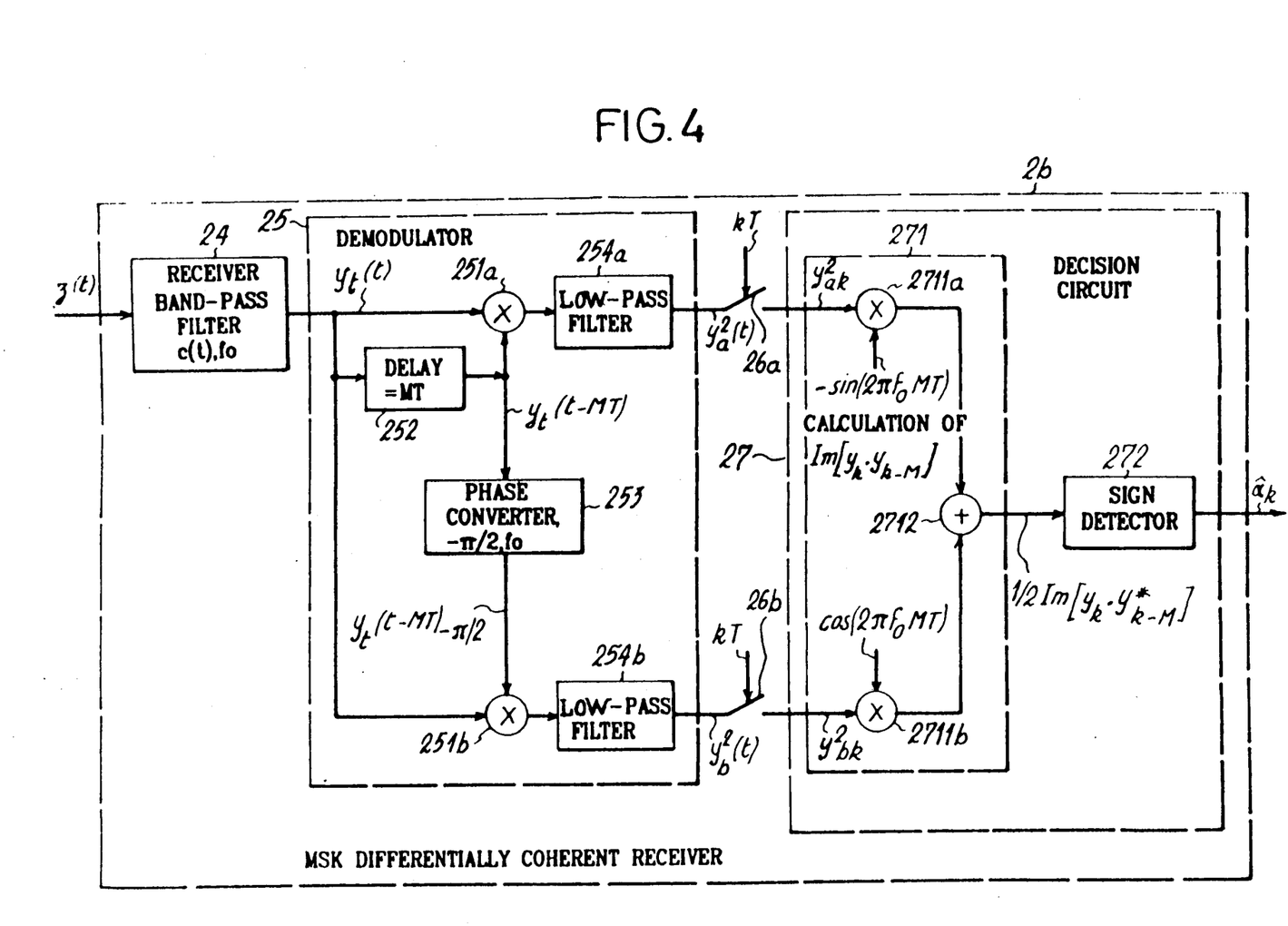
FIG. 4 is a block diagram of a HILBERT type receiver with a band-pass receiver filter, included in a second preferred embodiment of the system.
Figure 5:
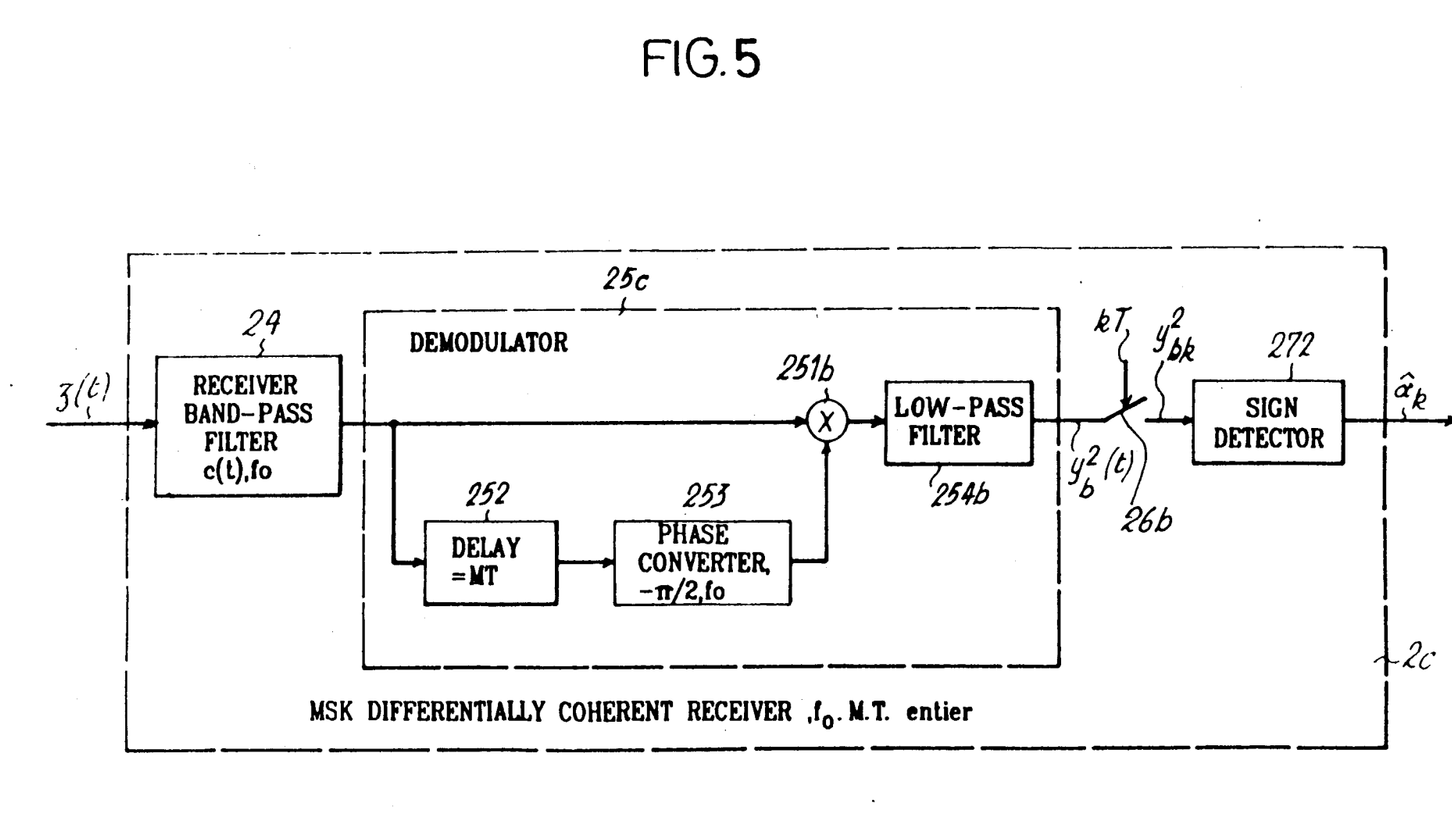
FIG. 5 is a block diagram of a receiver of simplified structure of the same type as the receiver in FIG. 5 deriving from the selection of a carrier frequency, of a rate frequency of the message symbols and of the integer M such that their product is an integer.

In order to facilitate the understanding of the functioning of the practical preferred embodiments of the transmission system embodying the invention, preferred embodiments described in reference to FIGS. 3 to 5, said system is first described, in reference to FIG. 1, for a transmission in baseband and in a simplified schematic form corresponding to a complex model of an equivalent system in baseband. In a complex space, the multiplication of a complex by j and −j respectively corresponds to phase rotations of $+\pi/2$ and $-\pi/2$. Furthermore, an MSK signal being comprised by the sum of two carriers, cos ($2\pi f_0 t$) and −sin ($2\pi f_0 t$), phase shifted by $-\pi/2$ and respectively modulated by first and second differentially coded signals according to the information to be transmitted, an MSK transmission system can be represented in the form of a 2-transmission path system, a "real" first path modulating the carrier cos ($2\pi f_0 t$) and an "imaginary" second path modulating the carrier −sin ($2\pi f_0 t$). The MSK signal transmitted on a transmission medium towards a receiver is altered by the transmission. After demodulation in said receiver, the each of received first and second differentially coded signals contain part of the information initially carried entirely by the other coded signal. To a transmitted symbol carried; e.g., by the first differentially coded signal corresponds at reception a received sample represented in the complex plane by a real component obtained by sampling of the first signal received during a first time gap corresponding to the transmission of the symbols by the transmitter and an imaginary component obtained by sampling of the second signal received during the same first time gap. Likewise, to a transmitted symbol carried by the second differentially coded signal corresponds at reception a received symbol represented in the complex plane by an imaginary component obtained by sampling of the second signal received during a second time gap corresponding to the transmission of the symbol by the transmitter and a real component obtained by sampling of the first signal received during the same second time gap.

From a mathematical analysis based on the theoretical model of the transmission system embodying the invention are deducted the optimal structure of a receiver filter included in a receiver of the system to produce a signal from which is eliminated the intersymbol interference, as well as an optimal differential detection law that is to be carried out by a decision circuit also included in said receiver so as to make the decisions with regard to the values of symbols transmitted by a transmitter of the system, and with a minimal probability of error.

In reference to FIG. 1, the transmission system embodying the invention comprises an MSK transmitter 1, and an MSK differentially coherent receiver 2. The transmitter 1 and the receiver 2 are connected by a transmission medium 3.

The transmitter is comprised of a differential encoder 11 and a transmitter filter 12.

The differential encoder 11 receives at input a message to be transmitted Me comprised of a string of K symbols $\alpha_0$ to $\alpha_{K-1}$, where K is an integer greater than one, the K symbols are mutually independent, with each taking on one of the equiprobable values 1, −1. At the encoder 11 output is issued a string of K complex symbols $a_0$ to $a_{K-1}$ in response to the input of symbols $\alpha_0$ to $\alpha_{K-1}$, respectively. The coding carried out by the encoder 11 being of the differential type, the symbols $a_0$ to $a_{K-1}$ are related by a differential coding function; this function is expressed by the equality:

$$a_k = j \cdot \alpha_k \cdot a_{k-M}, \quad (1)$$

where k is a whole index between 0 and K−1, M is a whole parameter preferably odd and greater than 1, and j is the imaginary of unity module such that $j^2 = -1$. The symbols $a_0$ to $a_{K-1}$ alternatively take on real values 1 or −1 and imaginary values j or −j. In the known MSK transmission systems, the parameter M usually takes on the value M=1, i.e. the value of a $(k+1)^{th}$ symbol $a_k$ issued by the differential encoder depends on the value of the previous symbol $a_{k-1}$ issued by the differential encoder. In the system embodying the invention, the value of $(k+1)^{th}$ symbol $a_k$ issued by the encoder 11 depends on the value of the $(k+1-M)^{th}$ symbol $a_{k-M}$ issued by the encoder 11. The finality of this disposition will be more obvious at a later stage of the description. The encoder 11 memorizes initial symbols $a_{-M}$ to $a_{-1}$. The symbols $a_{-M}$ to $a_{-1}$ are determined in such a way that the symbols $a_k$ are equal to 1 or −1 when k is an even integer equal to 2n, and are equal to j or −j when k is an odd integer equal to 2n+1.

The transmitter filter 12 receives at its input the complex symbols $a_0$ to $a_{K-1}$ at a frequency rhythm 1/T and issues at its output an MSK signal in baseband $s_b(t)$. The complex envelope $s_b(t)$ of the MSK signal is expressed by the equality:

$$s_b(t) = (2E_b)^{\frac{1}{2}} \sum_{k=0}^{k=K-1} a_k \cdot h(t - kT), \quad (2)$$

where $E_b$ is the energy of the signal during the time gap of duration T, and h(t) is the impulse response of the filter 12 provided by the equalities:

$$h(t) = (T)^{-\frac{1}{2}} \cdot \sin((\pi/2T) \cdot t) \text{ for t between } \epsilon[0, 2T]$$

and $$h(t) = 0, \text{ for t } \epsilon[0, 2T].$$

The receiver 2 is comprised of a receiver filter 21, a sampler 22 of sampling frequency 1/T, and a decision circuit 23.

The receiver filter 21 receives at its input an MSK signal in baseband $z_b(t)$ corresponding to the transmitted signal $s_b(t)$:

$$z_b(t) = s_b(t) \cdot \exp(j\theta) + n(t), \quad (3)$$

where exp (j$\theta$) and n(t) respectively represent a phase shift and a complex Gaussian noise introduced by the transmission of the signal $s_b(t)$ through the transmission medium 3. At its output, the filter 21 supplies a signal y(t) expressed by the convolution product:

$$y(t) = \int_{-\infty}^{+\infty} x(\tau) \cdot g(\tau - t) \cdot d\tau, \quad (4)$$

where $g(-t)$ represents the impulse response of the receiver filter 21 and $\tau$ a temporal variable.

The signal $y(t)$ is sampled by the sampler 22 at frequency $1/T$. At the sampling instants $kT$, the sampler 22 supplies samples $y(kT)$ of the signal $y(t)$, also noted $y_k$. From the equalities (2), (3) and (4), it ensues that a sample $y_k$ is determined by the equality:

$$y_k = (2E_b)^{\frac{1}{2}} \cdot \exp(j\theta) \cdot \sum_{m=0}^{m=K-1} a_m \cdot \quad (5)$$

$$\int_{-\infty}^{+\infty} h(t - mT) \cdot g(t - kT) \cdot dt + V_k,$$

where $m$ is a whole number index and $V_k$ is a noise caused by the integration of the noise $n(t)$.

In a system embodying the invention, the samples $y_k$ must be freed from the intersymbol interference so as to reduce the probability of decision error. A sample $y_k$ must only depend on the symbol $a_m32\ k$ to the exclusion of another symbol $a_m \neq k$; this condition is only fulfilled if the integral:

$$\int_{-\infty}^{+\infty} h(t - mT) \cdot g(t - kT) \cdot dt$$

is zero for all $m \neq k$; which amounts to satisfying Nyquist's condition:

$$\int_{-\infty}^{+\infty} h(t) \cdot g(t - kT) \cdot dt = \delta_{0,k} \quad (6)$$

whereby $\delta_{0,k}$ represents Kronecker's symbol equal to 1 for $k=0$ and equal to 0 for $k \neq 0$.

The sample $y_k$ is then expressed by the equality:

$$y_k = (2E_b)^{\frac{1}{2}} \cdot \exp(j\theta) \cdot a_k + V_k. \quad (7)$$

In order to preserve the optimity of the filter 21, the function $h(t)$ must necessarily be decomposable into a sum of functions $g(t-qT)$. The following equality must be verified:

$$h(t) = \sum_{q=-Q}^{q=Q} P_q \cdot g(t - qT), \quad (8)$$

whereby the coefficients $p_q$ are real coefficients respectively associated with the functions $g(t-qT)$ and the index $q$ is an integer that takes on positive and negative values between $-Q$ and $Q$. In the complex plane of Fourier transforms, the equality (8) becomes:

$$H(f) = G(f) \cdot \sum_q p_q \cdot \exp(-j2\pi fqT)$$

where $H(f)$ and $G(f)$ are respectively the Fourier transforms of the functions $h(t)$ and $g(t)$. From this last equality is deducted the expression of the transfer function $G^*(f)$ of the receiver filter 21, which transfer function is the Fourier transform of the function $g(-t)$. The expression:

$$1/\sum_q p_q \cdot \exp(-j2\pi fqT)$$

being real, the function $G^*(f)$ is determined by the equality:

$$G^*(f) = H^*(f)/\sum_q p_q \cdot \exp(-j2\pi fqT) \quad (9)$$

where the symbol * indicates the corresponding conjugate complex.

From the expression (9) is derived the receiver filter 21 which is comprised of a conventional filter 21 matched with the waveform of the impulse response $h(t)$ and having a transfer function $H^*(f)$ which is the conjugate complex of the transfer function $H(f)$ of the transmitter filter 12, and of an equalizer 212 having a transfer function $E_r(f)$ approximating the theoretical transfer function:

$$E(f) = 1/\sum_q p_q \cdot \exp(-j2\pi fqT)$$

The coefficients $p_q$ are calculated from the expression:

$$p_q = \int_{-\infty}^{+\infty} h(t) \cdot h(t - qT) \cdot dt.$$

This expression is deducted from the equality (8) by calculation of the convolution product on each side of the equality (8) and by application of Nyquist's condition (6). The calculation of the coefficients $p_q$ for the expression $h(t)$ given after the equality (2), gives:

$p_{-1} = 1/\pi$ $p_0 = 1$ $p_1 = 1/\pi$ and $p_q = 0$ for $q \in [-1, 0, 1]$

Given $E(z)$, the z-transform corresponding to the function $E(f)$:

$E(z) = 1/(1 + (1/\pi) \cdot z^{-1} + (1/\pi) \cdot z)$

The transform $E(z)$ of the transfer function $E(f)$ comprises an unstable pole, i.e. of module greater than 1, and cannot therefore be achieved practically. However, the theoretical transfer function $E(f)$ is approximated by the transfer function $E_r(f)$ which can be achieved practically and calculated to minimize, in the absence of noise, the RMS error between the responses due at $E(f)$ and $E_r(f)$. The transfer function $E_r(f)$ must be shown to satisfy the expression:

$$E_r(f) = \sum_q c_q \cdot \exp(-j2\pi fqT),$$

in which the coefficients $c_q$ are such that $c_q = c_{-q}$ and satisfy the matrix relation:

$$P' = B \times C,$$

where $P'$ and $C$ are vectors having respectively as components the coefficients $p_{-q}$ and $c_q$, and B is a square matrix having $(2Q+1)^2$ coefficients such that:

$$b_{ij} = \sum_q p_q \cdot p_{q+i-j}$$

i and j respectively representing the line and the column in the matrix B of the coefficient $b_{ij}$ in question.

The equalizer 212 can be realized in the form of an analog equalizer by means of delay circuits comprised of delay lines. It can also be realized in digital form, e.g. by means of a micro-computer or a digital circuit. In the latter case, it comprises at its input a sampler followed by an analog/digital converter. In such an instance the sampler 22 of the receiver 2 is not included and it is possible to realize the function of the decision circuit 23 by said micro-computer. Furthermore, the equalizer 212 and the matched filter 211 can be realized in the form of a single digital or analog filter 21.

Figure 2:
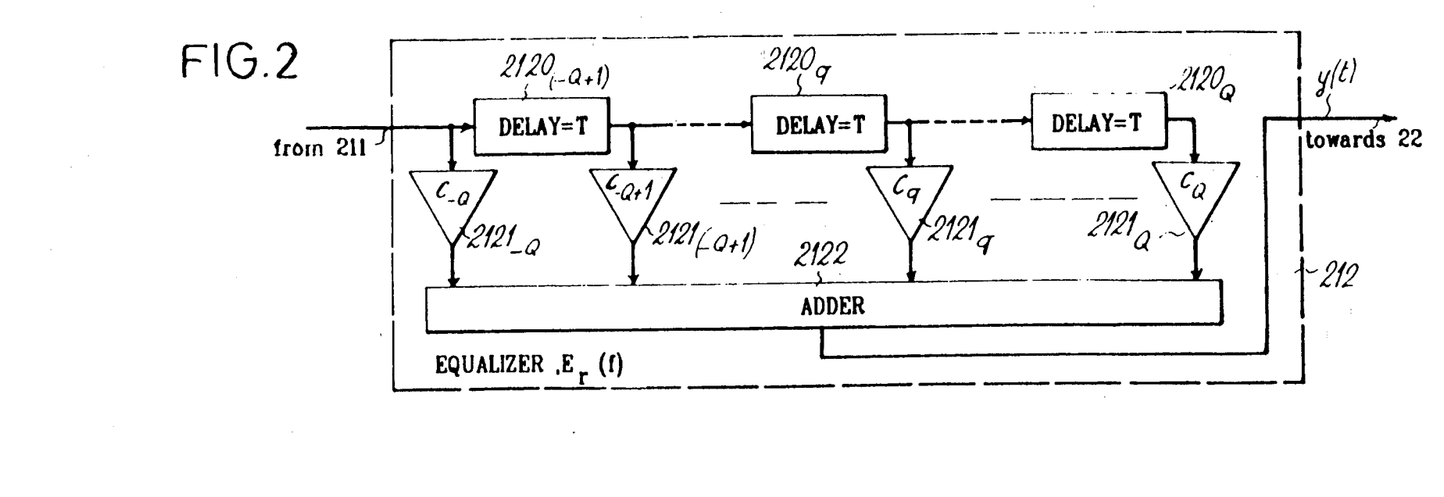
FIG. 2 is a schematic diagram of an analog or digital equalizer included in a receiver of the system so as to eliminate the intersymbol interference.

The general structure of the equalizer 212 is shown in FIG. 2. This structure is conventional and is directly derived from the expression of $E_r(f)$. The equalizer 212 comprises 2Q delay circuits $2120_{(-Q+1)}$ to $2120_Q$, $2Q+1$ amplifiers $2121_{-Q}$ to $2121_Q$, and a $2Q+1$-input summing integrator or adder 2122. The delay circuits each realize a delay of duration equal to T. The summing circuit 2122, which approximates an integrator, issues at its output the signal y(t) freed from the intersymbol interference at the sampling instants kT.

Though freed from the intersymbol interference by the filter 21, the samples $y_k$ contain a noise $V_k$, as shown by the equality (7). The noise $V_k$ is a correlated noise; its auto-correlation function is equal to:

$$A(V_k, V_{k-u}) = 2N_0 q_u,$$

whereby u is a whole index, $2N_0$ is the power spectral density of the noise n(t) in the frequency band of the signal $s_b(t)$ transmitted by the transmitter 1, and where $q_u$ is the coefficient of index u given by the equality:

$$q_u = T \int_{\frac{1}{2}T}^{\frac{1}{2}T} \left[ \exp(j2\pi uT)/\sum_q p_q \exp(-j2\pi fqT) \right] \cdot df. \quad (10)$$

The decision circuit 23 is designed to maximize the expression:

$$\exp[-(2E_b/N_0) \cdot (q_0 - q_M \cdot Re[a_k^i \cdot a_{k-M}^{i*}])/(q_0^2 - q_M^2)] \cdot \quad (11)$$

$$I_0 [2 (2E_b)^{\frac{1}{2}} \cdot |Y^{*t} \cdot R_v^{-1} \cdot A_I|]$$

where Re[.] is the real component of the complex product between square brackets, $a_k^i$ and $a_{k-M}^{i*}$ being respectively the complex symbols liable to be transmitted, where $I_0[.]$ is the modified Bessel function of degree zero, and $|Y^{*t}.R^{-1}_v.A_I|$ is the module of the scalar $Y^{*t}.R^{-1}_v.A_I$, Y and $A_I$ being respectively vectors of coordinates $(y_k, y_{k-M})$ and $(a_k^i, a_{k-M}^i)$, $R^{-1}_v$ being the inverse matrix to a noise correlation matrix:

$$R_v = 2N_0 \cdot \begin{vmatrix} q_0 & q_M \\ q_M & q_0 \end{vmatrix},$$

the coefficients $q_u$ being determined by the equality (10), and $Y^{*t}$ being the transposed line vector corresponding to column vector $Y^*$.

The decision circuit 23 must make the decision that maximizes the expression (11). To simplify the expression (11) M is odd. The product $a_k^i.a_{k-M}^{i*}$ is then an imaginary, given that the coefficients $a_k^i$ are alternatively real and imaginary. By developing the expression (11), the expression of the optimal decision $\alpha_k$ corresponding to the symbol $\alpha_k$ can be found:

$$a_k = 1. \text{ sign of } [Im[y_k \cdot y^*_{k-M}]]. \quad (12)$$

It can also be shown that the probability of decision error made on a symbol $\alpha_k$ decreases as M increases. For M having an infinite value in practice greater than or equal to 3, the probability of decision error is equal to: $(\frac{1}{2}) \exp(-E_b/N_0.q_0)$. This error in the case of an equivalent transmission system with binary differential modulation at two phase states (BSPK) taken as a reference is given by the known expression:

$$(\tfrac{1}{2}).\exp(-E_b/N_0).$$

For the same probability of decision error, a transmission system embodying the invention must therefore have a signal/noise ratio equal to $E_b/N_0$, greater in dB by 10 log $q_0$ by comparison with the signal/noise ratio required for the BPSK modulation transmission system. For the coefficients $p_0 = 1$, $p_1 = p_{-1} = 1/\pi$, the coefficient $q_0$ is equal to 1.3, whence:

$$10 \log q_0 = 1.13 \ dB.$$

Such a result represents an improvement of at least 1.5 dB compared to the state of the art notably compared to the transmission system described by M. K. SIMON and C. C. WANG.

A first preferred embodiment of the transmission system embodying the invention comprising an MSK transmitter 1a and a receiver 2a with baseband receiver filters is shown in FIG. 3.

The MSK transmitter 1a is of the linear modulator type. It comprises a differential encoder 11, and a linear modulator 13.

The differential encoder 11 receives at its input the message to be transmitted Me comprised of K symbols $\alpha_0$ to $\alpha_{K-1}$ and issues the components $Re[a_{2n}]$ of the real symbols $a_{2n}$ and the components $Im[a_{2n+1}]$ of the imaginary symbols $a_{2n+1}$ at first and second outputs 111 and 112. The differential encoder 11 is a sequential logic circuit easily realized by those skilled in the art by means of logic gates and sweep circuits; its internal structure is therefore not described in detail herein.

The linear modulator 13 comprises 2 transmitter filters 12r and 12i, two analog multiplying devices 131r and 131i and an analog summing integrator 132.

The transmitter filters 12r and 12i are analogous and have both the impulse response h(t) defined previously. The filter 12r receives at its input the components $Re[a_{2n}] = a_{2n}$ of the symbols $a_{2n}$ with an even index and issues at its output a signal comprised of a string of amplitude modulated impulses amplitude $s_r(t)$. The filter 12i receives at its input the components $\text{Im}[a_{2n+1}] = a_{2n+1}/j$ of the symbols $a_{2n+1}$ with an odd index and issues at its output a signal comprised of a string of amplitude modulated impulses amplitude $s_i(t)$.

The multiplying device 131r receives the signal $s_r(t)$ and a sinusoidal carrier cos $(2\pi f_0 t)$ of frequency $f_0$ at first and second inputs respectively and issues at its output on amplitude modulated carrier frequency signal $s_r(t) \cdot \cos(2\pi f_0 t)$. The multiplying device 131i receives the signal $s_i(t)$ and a sinusoidal carrier $-\sin(2\pi f_0 t)$ of frequency $f_0$ and phase shifted by $-\pi/2$ by comparison with the carrier $\cos(2\pi f_0 t)$, at first and second inputs respectively. The multiplying device 131i issues at its output an amplitude modulated carrier frequency signal $-s_i(t) \cdot \sin(2\pi f_0 t)$. The summing integrator 132 receives the signals $s_r(t) \cdot \cos(2\pi f_0 t)$ and $-s_i(t) \cdot \sin(2\pi f_0 t)$ at first and second inputs respectively and issues at its output an MSK signal at carrier frequency $s(t) = s_r(t) \cdot \cos(2\pi f_0 t) - s_i(t) \cdot \sin(2\pi f_0 t)$. The signal $s(t)$ is transmitted to the receiver 2a through the transmission connection 3.

The receiver 2a comprises a demodulator 20, two receiver filters 21r and 21i, two samplers 22r and 22i, and a decision circuit 23.

The demodulator 20 comprises two analog multiplying devices 201r and 201i and a non-triggered local oscillator (not shown) issuing two sinusoidal carriers, 2 cos $(2\pi f_0 t)$ and $-2 \sin(2\pi f_0 t)$, of nominal frequency $f_0$ and phase shifted from one another by $-\pi/2$.

The multiplying devices 201r and 201i are analogous and both receive respectively at first inputs a signal $z(t)$ corresponding to a signal $s(t)$ phase shifted and noised by its transmission through the connection 3. The multiplying device 201r receives the sinusoidal carrier of frequency $f_0$, 2 cos $(2\pi f_0 t)$, at a second input and issues at output the signal $2 z(t) \cdot \cos(2\pi f_0 t)$ comprised of a sum of a real component of the signal $s_r(t)$, of a real component of the signal $s_i(t)$, and of other components around the frequency $2f_0$ in the frequency spectrum. The multiplying device 201i receives the sinusoidal carrier $-2 \sin(2\pi f_0 t)$ of frequency $f_0$ at a second its input and issues at output the signal $-2 \cdot z(t) \cdot \sin(2\pi f_0 t)$ comprised of a sum of imaginary components of the signal $s_r(t)$ of an imaginary component of the signal $s_i(t)$, and of other components around the frequency $2f_0$ in the frequency spectrum.

The receiver filters 21r and 21i are analogous to the filter 21 described in reference to FIG. 1. They are both comprised of a matched filter and of an equalizer. The filter 21r receives at its input the signal $2.z(t) \cdot \cos(2\pi f_0 t)$ and issues at its output a signal $y_r(t)$ representing the real components of signals $s_r(t)$ and $s_i(t)$ included in the signal $2.z(t) \cdot \cos(2\pi f_0 t)$. The other components around the frequency $2f_0$ included in the signal $2z(t) \cdot \cos(2f_0 t)$ are eliminated by the low-pass filter 21r. The filter 21i receives at its input the signal $-2.z(t) \cdot \sin(2\pi f_0 t)$ and issues at its output a signal $y_i(t)$ representing the imaginary components of the signals $s_r(t)$ and $s_i(t)$ included in the signal $-2.z(t) \cdot \sin(2\pi f_0 t)$. The other components around the frequency $2f_0$ included in the signal $-2.z(t) \cdot \sin(2f_0 t)$ are eliminated by the filter 21i. The 60 signals $y_r(t)$ and $y_i(t)$ represent respectively the real and imaginary components of the complex signal $y(t)$ (FIG. 1) corresponding to the real symbols $a_{2n}$ and the imaginary symbols $a_{2n+1}$ transmitted.

The samplers 22r and 22i are analogous. They receive at their inputs the signals $y_r(t)$ and $y_i(t)$ respectively and issue corresponding samples $y_{rk}$ and $y_{ik}$ at the sampling instants kT. The samples $y_{rk}$ and $y_{ik}$ are respectively the real and imaginary components of a complex sample $y_k = y_{rk} + j \cdot y_{ik}$ corresponding to a complex symbol $a_k$.

The decision circuit 23 comprises a $\text{Im}[y_k \cdot y^*_{k-M}]$ calculating circuit 231, and a sign detector 232.

The $\text{Im}[y_k \cdot y^*_{k-M}]$ calculating circuit 231 comprises two delay circuits 2311r and 2311i, two analog multiplying devices 2312a and 2312b and an analog summing integrator 2313. The circuit 231 receives the samples $y_{rk}$ and $y_{ik}$ issued by the samplers 22r and 22i.

The sample $y_{rk}$ is applied in parallel to the input of the delay circuit 2311r and a first input of the multiplying device 2312a. The sample $y_{ik}$ is applied in parallel to the input of the delay circuit 2311i and a first input of the multiplying device 2312b. The delay circuits 2311r and 2311i respectively issue samples $y_{r(k-M)}$ and $y_{i(k-M)}$ at outputs thereof. The samples $y_{r(k-M)}$ and $y_{i(k-M)}$ are respectively the real and imaginary components of the complex sample $y_{k-M}$ corresponding to the complex symbol $a_{k-M}$. The multiplying devices 2312a and 2312b issue at outputs thereof the products $y_{rk} \cdot y_{i(k-M)}$ and $y_{ik} \cdot y_{r(k-M)}$. The product signals are supplied respectively to inverting $(-)$, and non-inverting $(+)$ inputs of the summing integrator 2313. The summing integrator 2313 supplies at its output the imaginary component $\text{Im}[y_k \cdot y^*_{k-M}] = y_{ik} \cdot y_{r(k-M)} - y_{rk} \cdot y_{i(k-M)}$ of the complex product $y_k \cdot y^*_{k-M}$.

The sign detector 232 receives at its input the imaginary component $\text{Im}[y_k \cdot y^*_{k-M}]$ supplied by the calculating circuit 231 and issues at its output a decision $\alpha_k = 1$ when said component is positive, and equal to $\alpha_k = -1$ when it is negative.

A second preferred embodiment of the transmission system embodying the invention comprises a transmitter analogous to the transmitter 1a shown in FIG. 3 and a receiver 2b, FIG. 4, of the HILBERT receiver type with a $\pi/2$ phase shift, which receiver does not require a local oscillator for demodulation of the received signal $z(t)$.

The rear of FIG. 4 comprises a band-pass receiver filter 24 having a midband frequency equal to the carrier frequency $f_0$, a demodulator 25, and a decision circuit 27.

The band-pass receiver filter 24 has an impulse response c(t) and is the band-pass filter of midband frequency $f_0$ corresponding to the baseband receiver filter 21r, 21i shown in FIG. 3. The impulse response c(t) of the band-pass filter 24 is deducted, as is known, from the impulse response $g(-t)$ of the baseband filter 21r, 21i. The impulse response c(t) of the filter 24 is given by the expression:

$$c(t) = 2 \cdot Re[g(-t) \cdot \exp(j2\pi f_0 t)].$$

The structure of the filter 24 remains analogous to that of the baseband filter 22r, 22i. The filter 24 comprises a matched band-pass filter and an equalizer.

The receiver filter 24 receives at its input the signal $z(t)$ and issues at its output a signal $y_r(t)$:

$$\begin{aligned} y_r(t) &= Re[y(t) \cdot \exp(j2\pi f_0 t)] \\ &= Re[y(t)] \cdot \cos(2\pi f_0 t) + Re[j \cdot y(t)] \cdot \sin(2\pi f_0 t) \\ &= y_r(t) \cdot \cos(2\pi f_0 t) - y_i(t) \cdot \sin(2\pi f_0 t), \end{aligned}$$

where y(t) is the complex signal previously defined having real $y_r(t)$ and imaginary $y_i(t)$ components, respectively derived by the corresponding baseband filters 21r and 21i in response to the demodulated signal z(t) (FIG. 3). The signal $y_r(t)$ is supplied to the demodulator 25.

The demodulator 25 comprises two analog multiplying devices 251a and 251b, a delay circuit 252, a $-\pi/2$ phase converter 253, and two low-pass filters 254a and 254b.

The signal y(t) is applied is parallel to the input of the delay circuit 252 and to a first input of each of multiplying devices 251a and 251b. The delay circuit supplies at its output a signal $y_r(t-MT)$ corresponding to the signal $y_r(t)$ delayed by a duration equal to MT:

$$y_r(t-MT) = y_r(t-MT) \cdot \cos(2\pi f_0(t-MT)) - y_r(t-MT) \cdot \sin(2\pi f_0(t-MT)).$$

The signal $y_r(t-MT)$ is applied is parallel to the input of the phase converter 253 and a second input of the multiplying device 251a.

The phase converter 253 shifts by $-\pi/2$ the phase of the carrier of frequency $f_0$ and does not alter the other components of the signal $y_r(t-MT)$ of frequency different to $f_0$. The phase converter 253 issues at its output a signal $y_r(t-MT)_{-\pi/2}$ corresponding to the signal $y_r(t-MT)$ which is phase shifted by $-\pi/2$:

$$y_r(t-MT)_{-\pi/2} = y_r(t-MT) \cdot \sin(2\pi f_0(t-MT)) + y_r(t-MT) \cdot \cos(2\pi f_0(t-MT)).$$

The phase converter 253 supplies the signal $y_r(t-MT)_{-\pi/2}$ at a second input of the multiplying device 251b.

The multiplying devices 251a and 251b respectively issue at outputs thereof the products:

$$y_r(t) \cdot y_r(t-MT) \text{ and } y_r(t) \cdot y_r(t-MT)_{-\pi/2}.$$

The products $y_r(t) \cdot y_r(t-MT)$ and $y_r(t) \cdot y_r(t-MT)_{-\pi/2}$ are respectively applied to inputs of the low-pass filters 254a and 254b.

The function of the low-pass filters 254a and 254b is to eliminate the components of the products $y_r(t) \cdot y_r(t-MT)$ and $y_r(t) \cdot y_r(t-MT)_{-\pi/2}$ around the frequency $2f_0$. The low-pass filters 254a and 254b respectively issue signals $y^2_a(t)$ and $y^2_b(t)$ corresponding to the products $y_r(t) \cdot y_r(t-MT)$ and $y_r \cdot y_r(t-MT)_{-\pi/2}$ after low-pass filtering:

$$y_a^2(t) = (\tfrac{1}{2}) \cdot [y_r(t) \cdot y_r(t-MT) \cdot \cos(2\pi f_0 MT) + y_r(t) \cdot$$
$$y_r(t-MT) \cdot \sin(2\pi f_0 MT) - y_r(t-MT) \cdot y_r(t) \cdot \sin(2\pi f_0 MT) +$$
$$y_r(t) \cdot y_r(t-MT) \cdot \cos(2\pi f_0 MT)],$$

and $$y_b^2(t) = (\tfrac{1}{2}) \cdot [y_r(t) \cdot y_r(t-MT) \cdot \sin(2\pi f_0 MT) - y_r(t) \cdot$$
$$y_r(t-MT) \cdot \cos(2\pi f_0 MT) + y_r(t-MT) \cdot y_r(t) \cdot \cos(2\pi f_0 MT) +$$
$$y_r(t) \cdot y_r(t-MT) \cdot \sin(2\pi f_0 MT)]$$

The signals $y^2_a(t)$ and $y^2_b(t)$ are respectively supplied to inputs of the samplers 26a and 26b which issue outputs thereof samples $y^2_{ak}$ and $y^2_{bk}$. The samples $y^2_{ak}$ and $y^2_{bk}$ are supplied to the decision circuit 27.

The decision circuit 27 comprises an $\mathrm{Im}[y_k \cdot y^*_{k-M}]$ calculating circuit 271 and a sign detector 272.

The calculating circuit 271 comprises two analog multiplying devices 2711a and 2711b and an analog summing integrator 2712. The multiplying devices 2711a and 2711b are analogous and respectively receive at first inputs thereof the samples $y^2_{ak}$ and $y^2_{bk}$. The multiplying devices 2711a and 2711b also respectively receive at second inputs thereof direct voltages of amplitude $-\sin(2\pi f_0 MT)$ and $\cos(2\pi f_0 MT)$. The multiplying device 2711a issues at a first output of the summing circuit 2712 the product $-y^2_{ak} \cdot \sin(2\pi f_0 MT)$; the multiplying device 2711b issues at a second output of the summing circuit 2712 the product $y^2_{bk} \cdot \cos(2\pi f_0 MT)$. The summing circuit 2712 issues at its output the sum of the products $-y^2_{ak} \cdot \sin(2\pi f_0 MT)$ and $y^2_{bk} \cdot \cos(2\pi f_0 MT)$ equal to:

$$(\tfrac{1}{2}) \cdot [y_{ik} \cdot y_r(k-M) - y_{rk} \cdot y_{i(k-M)}] = (\tfrac{1}{2}) \cdot \mathrm{Im}[y_k \cdot y^*_{k-M}].$$

The sign detector 272 is analogous to the sign detector 232 shown in FIG. 3. Detector 272 receives at its input the signal $2 \cdot \mathrm{Im}[_k \cdot y^*_{k-M}]$ issued by the summing circuit 2712, detects the sign of the signal and supplies at its output a decision $a_k = 1$ if the detected signal is positive and $a_k = -1$ if the detected signal is negative.

A third preferred embodiment of the transmission system embodying the invention comprises a transmitter analogous to the transmitter 1a shown in FIG. 3 and a receiver 2c, FIG. 5, having a simplified structure in comparison with the receivers 2a and 2b shown in FIGS. 3 and 4.

The expression $y^2_{b(t)}$ given previously shows that it is possible to simplify the structure of the receiver 2b by selecting the frequency $f_0$ and the duration M.T in such a way that the product $f_0.M.T$ is an integer. Indeed, in this case $\sin(2\pi f_0 MT) = 0$ and $\cos(2\pi f_0 MT) = 1$ and the signal $y^2_b(t)$ is then equal to $(\tfrac{1}{2})[y_r(t) \cdot y_r(t-MT) - y_r(t) \cdot y_r(t-MT)]$. The signal $(\tfrac{1}{2}) \mathrm{Im}[y_k \cdot y^*_{k-M}] = (\tfrac{1}{2})[y_{ik} \cdot y_r(k-M) - y_{rk} \cdot y_{i(k-M)}]$ can thus be directly obtained by sampling the signal $y^2_b(t)$ at the instants kT. The receiver 2c, shown in FIG. 5, is designed to function in the event of the product $f_0.M.T$ being an integer.

The receiver 2c is obtained by removing from the receiver 2a all the circuits intended to produce the signal $y^2_a(t)$, and the signal $(\tfrac{1}{2})\mathrm{Im}[y_k \cdot y^*_{k-M}]$ by combining the signals $y^2_a(t)$ and $y^2_b(t)$.

The receiver 2c therefore comprises the band-pass receiver filter 24, a demodulator 25c derived from the demodulator 25 by eliminating the multiplying device 251a and the low-pass filter 254a, the sampler 26b and the sign detector 272. The samples $y^2_b(t)$ issued by the sampler 26b are directly applied at input of the sign detector 272.

Figure 6:
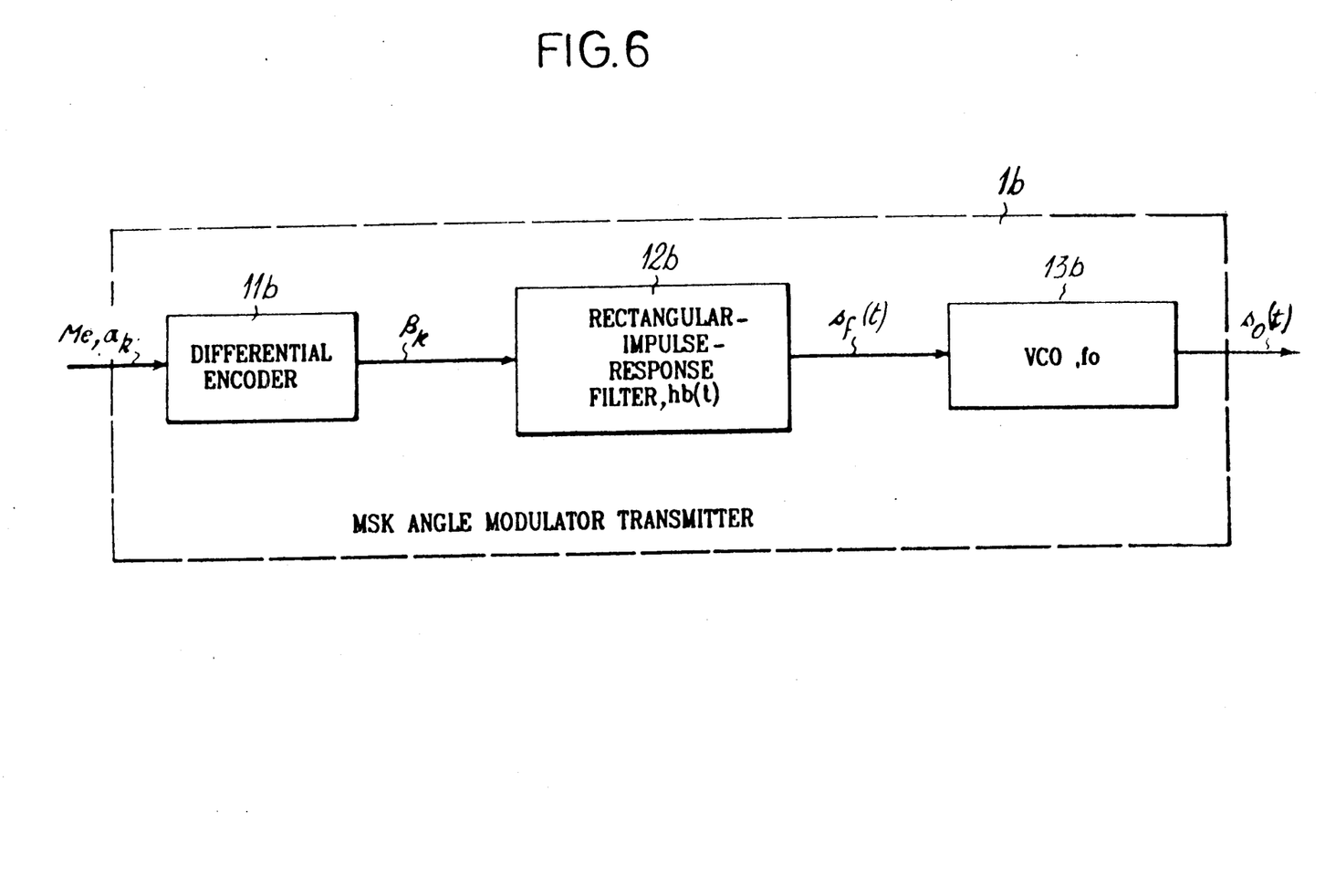
FIG. 6 is a block diagram of a transmitter with an MSK angle modulator included in the transmission system embodying the invention.

According to another preferred embodiment of the transmission system embodying the invention, the MSK linear-modulator transmitter 1a shown in FIG. 3 is replaced by an MSK angle-modulator transmitter 1b shown in FIG. 6.

The MSK angle-modulator transmitter 1b is comprised of a differential encoder 11b, of a filter 12b with a rectangular impulse response hb(t) of duration T and of a voltage controlled oscillator 13b (VCO) of middle frequency $f_0$, these three circuits being connected in cascade and in the above-mentioned order.

The differential encoder 11 receives at its input the message to be transmitted Me comprised of the symbols $a_0$ to $a_{K-1}$ and issues at its output a string of coded symbols $\beta_0$ to $\beta_{K-1}$. The symbols $\beta_0$ to $\beta_{K-1}$ are respectively issued in response to the symbols $a_0$ to $a_{K-1}$. The encoder 11b carries out a differential coding function expressed by the equality:

$$\beta_k = (-1)^{(M-1)/2} \cdot a_k \cdot \prod_{i=1}^{i=M-1} \beta_{k-i}$$

The symbols $\beta_0$ to $\beta_{K-1}$ are supplied at input of the filter 12b and amplitude modulate rectangular impulses of duration T derived by the rectangular-impulse-response filter 12b. These modulated rectangular impulses constitute a signal comprised of a string of impulses $s_f(t)$ applied to a modulation input of the VCO 13b. The signal $s_f(t)$ frequency modulates with a modulation index m=0.5 a carrier of frequency $f_0$ supplied by the VCO 13b. The VCO issues a signal $s_0(t)$ modulated in frequency at index m=0.5, equivalent to an MSK signal.

What is claimed is:

1. A minimum shift key (MSK) continuous phase modulation transmission system comprising differentially coherent type MSK transmitting equipment and differentially coherent type MSK receiving equipment which are connected through a transmission medium, said transmitting equipment comprising means for encoding a message having an ordered string of K symbols successively derived with a predetermined periodicity, T, into an ordered coded string of K differentially coded symbols, where K is an integer greater than one, the encoder deriving an MSK continuous phase signal modulated by a waveform having a string of impulses carrying said ordered coded string, said receiving equipment including: filter means matched with the waveform of the impulses of said impulse string, and means cascaded with said filter means for suppressing intersymbol interference inherent to said MSK type continuous phase signal from samples of a string of received impulses.

2. The transmission system claimed in claim 1, wherein said means for suppressing comprises an analog or digital equalizer.

3. The transmission system claimed in claim 1, wherein said encoding means performs a differential coding function such that any coded symbol of rank k in said coded string depends on the product of the coded symbols of ranks k−1 to k−M+1 and on the symbol of rank k in said incoming message, where k is successively every integer from 1 to K, and M is a delay time having an integral value greater than one.

4. The transmission system of claim 1 wherein the signal received by the receiver has a frequency $f_0$ and the means for suppressing includes means for deriving a first signal proportional to the product of the received signal and the received signal delayed by the linear combination of MT and one quarter of a cycle at $f_0$, where $f_0$MT and M have integral values so sin $2\pi f_0$MT=0 and cos $2\pi f_0$MT=1, and means for periodically sampling the first signal at times spaced from each other by T.

5. The transmission system of claim 4 further including means for detecting the polarity of the sampled first signal.

6. The transmission system of claim 1 wherein the means for suppressing includes first and second channels respectively responsive to the signal received by the receiver for respectively deriving first and second signals having orthogonally related components, means for simultaneously and periodically sampling the first and second signals at times spaced from each other by T, and means for combining the sampled first and second signals.

7. The transmission system of claim 6 wherein the first channel includes a first multiplier responsive to the received signal and a first reference wave having a first phase and a frequency equal to a carrier of the received signal and a first matched filter responsive to an output of the first multiplier, the second channel including a second multiplier responsive to the received signal and a second reference wave having the carrier frequency and a second phase orthogonal to the first phase and a second matched filter responsive to an output of the second multiplier, the first and second matched filters supplying signals to the sampling means, the first and second matched filters being included in said filter means.

8. The transmission system of claim 7 wherein the combining means includes a third multiplier responsive to the sampled signal derived by the first channel and a replica of the sampled signal derived by the second channel delayed by MT, where M is an integer, and a fourth multiplier responsive to the sampled signal derived by the second channel and a replica of the sampled signal derived by the first channel delayed by MT, and means for linearly combining product signals derived by the third and fourth multipliers.

9. The transmission system of claim 8 further including means for detecting the polarity of an output signal of the means for linearly combining.

10. The transmission system of claim 9 wherein M is an odd integer greater than one.

11. The transmission system of claim 5 wherein M is an odd integer greater than one.

12. The transmission system of claim 6 wherein the filter means is responsive to the signal received by the receiver, the first channel including a first multiplier responsive to an output signal of the filter means and the output signal as delayed by MT, where M is an integer, the second channel including a second multiplier responsive to the output signal and the output signal as delayed by a linear combination of MT and one quarter cycle of the output signal, the sampling means being responsive to orthogonal components derived from said first and second multipliers.

13. The transmission system of claim 12 wherein the means for combining includes: a third multiplier responsive to a sampled signal derived by said sampling means in response to the first multiplier and a first reference wave having the frequency $f_0$MT and a reference phase, where $f_0$ is the frequency derived by said filter means, a fourth multiplier responsive to a sampled signal derived by said sampling means in response to the second multiplier and a second reference wave having the frequency $f_0$MT and a phase orthogonally related to the reference phase, and means for linearly combining components derived from said third and fourth multipliers.

14. The transmission system of claim 13 further including means for detecting the polarity of an output signal of the means for linearly combining.

15. An MSK type continuous phase modulation transmission system comprising differentially coherent type transmitting equipment and differentially coherent type receiving equipment which are connected through a transmission medium, wherein said transmitting equipment is of the linear modulator type and comprises means for encoding an incoming message including an ordered string of K symbols successively derived at a predetermined period into an ordered coded string of K differentially coded symbols, where K is any integer greater than one, said encoding means deriving an MSK type continuous phase signal modulated by a string of impulses carrying said ordered coded string, said encoding means carrying out a differential coding function such that any coded symbol of rank k in said coded string depends on the product of the coded symbol of rank k−M and the symbol of rank k in said incoming message, where M is a predetermined odd integer greater than 1, said differentially coherent type receiving equipment comprising a filter matched with the waveform of the impulses of said impulse string, and means cascaded with said filter for suppressing intersymbol interference inherent to said MSK type continuous phase signal from samples of a string of received impulses.

16. A transmission system as claimed in claim 15, wherein said period at which are issued the K symbols of said message, the odd integer M, and a carrier frequency of said MSK type continuous phase signal are predetermined in such a way that their product is an integer.

17. An MSK type continuous phase modulation transmission system comprising differentially coherent type transmitting equipment and receiving equipment which are connected through a transmission medium, wherein said transmitting equipment comprises means for encoding a message having an ordered string of K symbols successively derived at a predetermined period into an ordered coded string of K differentially coded symbols and for deriving an MSK continuous phase signal modulated by a string of impulses carrying said ordered coded string, where K is any integer greater than one, said receiving equipment comprising: filter means matched with the waveform of the impulses of said impulse string, and means cascaded with said filter means for suppressing intersymbol interference inherent to MSK type continuous phase signals, and thereby deriving first and second signals comprising said received impulse string, wherein said receiving equipment further comprises means for deciding with a minimal probability of error the value of a $k^{th}$ symbol in said message according to first and second values of said first and second signals including said received impulse string respectively at first and second sampling instants, said first and second sampling instants being of ranks k−M and k respectively corresponding to the transmission by said transmitting equipment of said k−$M^{th}$ and $k^{th}$ coded symbols, where M is an odd integer greater than 1, said first values of said first and second signals at the first sampling instant of rank k−M respectively representing first and second components of a k−$M^{th}$ received coded symbol corresponding to the k−$M^{th}$ symbol of said message, said second values of said first and second signals at said second sampling instant of rank k respectively representing first and second components of a $k^{th}$ received coded symbol corresponding to the $k^{th}$ symbol of said message.

18. A transmission system as claimed in claim 17, wherein said deciding means comprises means for calculating the difference between the product of the first component of said k−$M^{th}$ received coded symbol and of said first component of said $k^{th}$ received coded symbol, and means for detecting the sign of said difference so as to decide directly from said sign the value to be attributed to said $k^{th}$ symbol of said message.

19. Receiving equipment in an MSK transmission system wherein an encoder at a transmitter derives a message having an ordered string of K symbols successively derived at a predetermined period T into an ordered coded string of K differentially coded symbols and for deriving an MSK continuous phase signal modulated by a string of impulses carrying said ordered coded string, where K is any integer greater than one, said receiving equipment comprising a filter means matched with the waveform of the impulses of said impulse string, and means cascaded with said filter means for suppressing intersymbol interference inherent to said MSK type continuous phase signals, and thereby deriving first and second signals comprising said received impulse string, wherein said receiving equipment further comprises means for deciding with a minimal probability of error the value of a $k^{th}$ symbol in said message according to first and second values of said first and second signals including said received impulse string respectively at first and second sampling instants, said first and second sampling instants being of ranks k−M and k respectively corresponding to the transmission by said transmitting equipment of said k−$M^{th}$ and $k^{th}$ coded symbols, where M is an odd integer greater than 1, said first values of said first and second signals at the first sampling instant of rank k−M respectively representing first and second components of a k−$M^{th}$ received coded symbol corresponding to the k−$M^{th}$ symbol of said message, said second values of said first and second signals at said second sampling instant of rank k respectively representing first and second components of a $k^{th}$ received coded symbol corresponding to the $k^{th}$ symbol of said message.

20. The receiver equipment of claim 19, wherein said deciding means comprises means for calculating the difference between the product of the first component of said k−$M^{th}$ received coded symbol and of said first component of said $k^{th}$ received coded symbol, and means for detecting the sign of said difference so as to decide directly from said sign the value to be attributed to said $k^{th}$ symbol of said message.

21. Receiving equipment in an MSK transmission system wherein an encoder at a transmitter derives a message having an ordered string of K symbols successively derived with a predetermined periodicity, T, into an ordered coded string of K differentially coded symbols, where K is an integer greater than one, the encoder deriving an MSK continuous phase signal modulated by a waveform having a string of impulses carrying said ordered coded string, said receiving equipment comprising filter means matched with the waveform of the impulses of said impulse string, and means cascaded with said filter means for suppressing intersymbol interference inherent to said MSK type continuous phase signal from samples of a string of received impulses, the signal received by the receiving equipment having a frequency $f_0$ and the means for suppressing includes means for deriving a first signal proportional to the product of the received signal and the received signal delayed by the linear combination of MT and one quarter of a cycle at $f_0$, where $f_0 MT$ and M have integral values so sin $2\pi f_0 MT = 0$ and cos $2\pi f_0 MT = 1$, and means for periodically sampling the first signal at times spaced from each other by T.

22. The receiving equipment of claim 21 further including means for detecting the polarity of the sampled first signal.

23. The receiving equipment of claim 22 wherein the means for suppressing includes first and second channels respectively responsive to the signal received by the receiver for respectively deriving first and second signals having orthogonally related components, means for simultaneously and periodically sampling the first and second signals at times spaced from each other by T, and means for combining the sampled first and second signals.

24. The receiving equipment of claim 23 wherein the first channel includes a first multiplier responsive to the received signal and a first reference wave having a first phase and a frequency equal to a carrier of the received signal and a first matched filter responsive to an output of the first multiplier, the second channel including a second multiplier responsive to the received signal and a second reference wave having the carrier frequency and a second phase orthogonal to the first phase and a second matched filter responsive to an output of the second multiplier, the first and second matched filters supplying signals to the sampling means, the first and second matched filters being included in said filter means.

25. The receiving equipment of claim 24 wherein the combining means includes a third multiplier responsive to the sampled signal derived by the first channel and a replica of the sampled signal derived by the second channel delayed by MT, where M is an integer, and a fourth multiplier responsive to the sampled signal derived by the second channel and a replica of the sampled signal derived by the first channel delayed by MT, and means for linearly combining product signals derived by the third and fourth multipliers.

26. The receiving equipment of claim 25 further including means for detecting the polarity of an output signal of the means for linearly combining.

27. The receiving equipment of claim 26 wherein M is an odd integer greater than one.

28. The receiving equipment of claim 27 wherein M is an odd integer greater than one.

29. The receiving equipment of claim 28 wherein the filter means is responsive to the signal received by the receiver, the first channel including a first multiplier responsive to an output signal of the filter means and the output signal as delayed by MT, where M is an integer, the second channel including a second multiplier responsive to the output signal and the output signal as delayed by a linear combination of MT and one quarter cycle of the output signal, the sampling means being responsive to orthogonal components derived from said first and second multipliers.

30. The receiving equipment of claim 29 wherein the means for combining includes: a third multiplier responsive to a sampled signal derived by said sampling means in response to the first multiplier and a first reference wave having the frequency $f_0 MT$ and a reference phase, where $f_0$ is the frequency derived by said filter means, a fourth multiplier responsive to a sampled signal derived by said sampling means in response to the second multiplier and a second reference wave having the frequency $f_0 MT$ and a phase orthogonally related to the reference phase, and means for linearly combining components derived from said third and fourth multipliers.

31. The receiving equipment of claim 30 further including means for detecting the polarity of an output signal of the means for linearly combining.

32. Differentially coherent receiving equipment in an MSK transmission system wherein an encoder at a transmitter derives a message having an ordered string of K symbols successively derived with a predetermined periodicity, T, into an ordered coded string of K differentially coded symbols, where K is an integer greater than one, the encoder deriving an MSK continuous phase signal modulated by a waveform having a string of impulses carrying said ordered coded string, said receiving equipment comprising differentially coherent filter means matched with the waveform of the impulses of said impulse string, and means cascaded with said filter means for suppressing intersymbol interference inherent to said MSK type continuous phase signal from samples of a string of received impulses.

* * * * *